United States Patent [19]
Ogata

[11] Patent Number: 6,122,080
[45] Date of Patent: Sep. 19, 2000

[54] FINDER EQUIPPED WITH AN INDICATOR

[75] Inventor: Yasuji Ogata, Hachioji, Japan

[73] Assignee: Olympus Optical Co., Ltd., Tokyo, Japan

[21] Appl. No.: 09/267,605

[22] Filed: Mar. 15, 1999

[30] Foreign Application Priority Data

Mar. 16, 1998 [JP] Japan ................................. 10-065182

[51] Int. Cl.[7] ............................ G02B 5/32; G02B 23/10; G03H 1/22; G03B 13/02; G03B 17/00
[52] U.S. Cl. ............................ 359/15; 359/33; 359/428; 359/634; 396/288; 396/296
[58] Field of Search ..................... 359/15, 16, 19, 359/32, 33, 589, 634, 428, 431, 362; 396/288, 296

[56] References Cited

U.S. PATENT DOCUMENTS

| | | | |
|---|---|---|---|
| 4,294,529 | 10/1981 | Sato et al. | 396/288 |
| 4,811,061 | 3/1989 | Sud et al. | 356/152.1 |
| 5,581,318 | 12/1996 | Shiratori | 359/296 |

FOREIGN PATENT DOCUMENTS

| | | |
|---|---|---|
| 9-15684 | 1/1997 | Japan . |
| 9-80589 | 3/1997 | Japan . |
| 9-127457 | 5/1997 | Japan . |

*Primary Examiner*—Jon Henry
*Attorney, Agent, or Firm*—Pillsbury Madison & Sutro LLP

[57] ABSTRACT

The invention relates to a space-saving yet high-quality real image type finder indicator wherein an optical member such as a hologram is used for a device for indicating various information in a finder. In a finder optical system has an objective system, an image erection system and an eyepiece system; A hologram H is provided on a reflecting surface of the image erection system, so that an image at an indication portion is indicated by hologram H in visual field of the finder.

12 Claims, 9 Drawing Sheets

FINDER EQUIPPED WITH AN INDICATOR

BACKGROUND OF THE INVENTION

1. Filed of the Invention

The present invention relates generally to a finder equipped with an indicator, and more specifically to an indicator-within-finder comprising an optical member such as hologram, which is used with cameras such as silver-salt cameras or digital still cameras.

2. Discussion of Related Art

So far, many proposals have been made of finder indicators used with cameras, which are generally broken down into (a) a type of for guiding information from outside an optical path using a microprism, (b) a type for providing information to a user by emitting light from a light source from the side of an eyepiece system, (c) a type having a liquid crystal display device located within an optical path, and (d) a so-called illuminated type where indication systems constructed apart from a finder visual field system are placed one upon another by a half-silvered prism or half-silvered mirror. With type (a) often used with single-lens reflex cameras, high-quality indications are obtainable, but the indications are limited to small sizes and presented on the periphery of the visual field as well. Type (b), often used with compact cameras, is inexpensive because of the simple design of emitting light from a light source, but is inferior in terms of the quality of indications.

In type (c) which has been used with recently developed compact cameras, a liquid crystal display device is located at an intermediate image plane position in a finder system, so that indications can be obtained at a desired position in a visual field by changing an indication pattern at a user's disposal. Accordingly, this type of indicator has a very high degree of flexibility and so is capable of indicating more and more information. However, one problem is that the finder becomes dark due to the low transmittance of currently available liquid crystal display devices. Another problem is that the finder is colored due to the hues or tints inherent in liquid crystals. Type (d) is an old-style finder used with traditional cameras but has been reused in recent years. In particular, a combination type (d) and type (c) indicator has often been noticeable. In a camera where this type is combined with an Albada finder, very satisfactory indications are obtainable because flares peculiar to the Albada finder are much reduced. In principle, indications are obtainable at a desired position in the finder visual field. Although this type indicator has a high degree of flexibility, it is unfavorable for size and cost reductions because the indication optical system and the visual field optical system are of equal size.

On the other hand, an indicator using a hologram has recently been proposed in the art, as typically disclosed in JP-A's 9-15684, 9-80589 and 9-127457. JP-A 9-15684 shows one application of such an indicator to an Albada finder, wherein a hologram previously obtained by multiple recording is bonded to one surface of an eyepiece so that an indication recorded therein can be reconstructed by illumination with a reconstructing light source. Since the hologram usually has a plurality of indications recorded therein, reconstructing light sources corresponding to desired indications may be interchanged for illumination purposes.

On the other hand, JP-A 9-127457 shows an indicator used with a vehicle, wherein a hologram is incorporated in a front glass to provide a driver with information regarding speed, etc. The absolute size of this indicator is much larger than that of an indicator used in a camera finder, and has a large available space and is of simple construction. JP-A 9-127457 teaches a turn-back structure so as to reduce the distance of the hologram to an indication portion.

In the above prior art, the indicators may be constructed with no difficulty because there is a space for accommodating holograms. In a real image type finder used with a camera, however, there is no space for receiving a hologram because of the need for an image erection system for image inversion.

In the prior applications of holograms to finders, the holograms are of the recorded type and so have a limited degree of flexibility in indications. In addition, a plurality of interchanging light sources or some movable mechanisms are required. Thus, the prior art device have grave demerits.

SUMMARY OF THE INVENTION

In view of such prior art problems as described above, an object of the invention is to provide a space-saving yet high-quality indicator used in a real image type camera finder, in which an optical member such as a hologram is used for an device for indicating various information in the finder.

According to one aspect of the present invention, the above object is achieved by the provision of a finder optical system with an indicator, comprising an objective system, an image erection system. An eyepiece system, wherein an optical member is provided on a reflecting surface of said image erection system so that an image at an indication portion is indicated by said optical member in a finder visual field. The optical member has a reflecting or transmitting property in only a wavelength range corresponding to an emission wavelength of the indication portion.

According to another aspect of the present invention, there is provided a finder optical system with an indicator, comprising an objective system, an image erection system and an eyepiece system, system. An optical member is provided on a transmitting surface of said image erection system so that an image at an indication portion is indicated by the optical member in a finder visual field. The optical member has a reflecting or transmitting property in only a wavelength range corresponding to an emission wavelength of the indication portion.

According to yet another aspect of the present invention, there is provided a finder optical system with an indicator, comprising an objective system, an image erection system; and an eyepiece system. A hologram is provided on a reflecting surface of the image erection system so that an image at an indication portion is indicated by the hologram in a finder visual field.

In the present invention, the image erection system is provided on its reflecting or transmitting surface with an optical member or a hologram having a reflecting or transmitting property in only the wavelength range corresponding to the emission wavelength of the indication portion. It is thus possible to indicate various information in the finder visual field and achieve a high-quality finder ensuring a bright visual field, and bright indications.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Some preferred embodiments of the finder equipped with an indicator according to the present invention are now explained with reference to the drawings.

First Embodiment

Figure 1A:
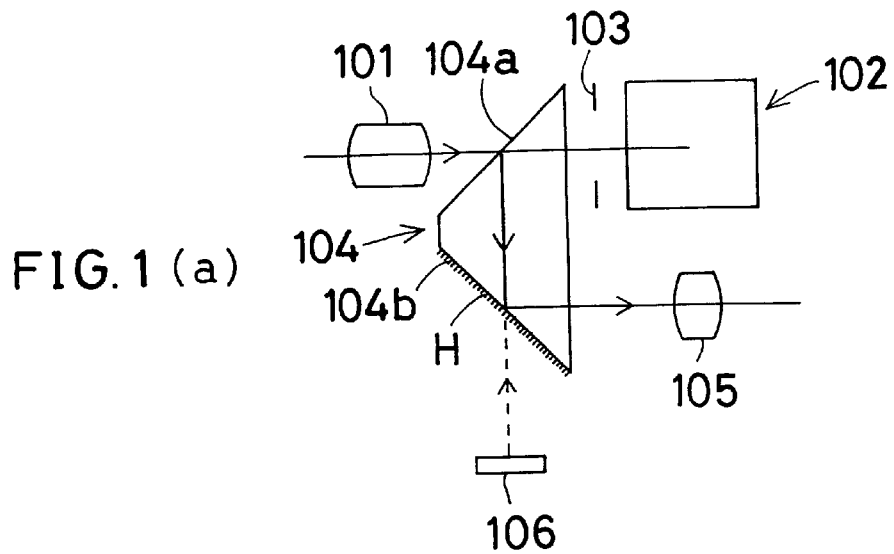
FIGS. 1(a), 1(b) and 1(c) are views of the construction and action of a first embodiment of the finder according to the invention.
Figure 1B:
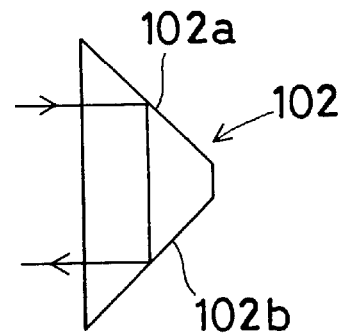

In the first embodiment, the present invention is applied to a Keplerian view finder designed to be mounted on a camera. FIG. 1(a) is a top view of the first embodiment, FIG. 1(b) is a side view of a first prism 102, and FIG. 1(c) is a conceptual rendering wherein a hologram H and its vicinities are exaggerated.

A ray bundle from a finder visual field passes through an objective 101, and then strikes on a first prism 102 where it is reflected at a first reflecting surface 102a thereof, so that an optical path is turned down. The ray bundle is then reflected at a second reflecting surface 102b toward a subject side, so that the optical path is again bent. Thereafter, an image is formed in the vicinity of a field frame 103. After this, the ray bundle is reflected twice at a first reflecting surface 104a and a second reflecting surface 104b of a second prism 104, reaching a user through a eyepiece 105.

A hologram H is mounted on the second reflecting surface 104b of the second prism 104, so that an image at an indication portion 106 located in front of the second reflecting surface 104b of the second prism 104 is formed under the diffracting action of the hologram H as a virtual image in the vicinity of the field frame 103. Upon leaving the hologram H, the ray bundle propagates toward the eyepiece 105, so that it can be recognized by a user while superposed on the ray bundle from the finder visual field. In other words, the user can observe indications while they are superposed one upon another in the finder visual field.

Figure 1C:
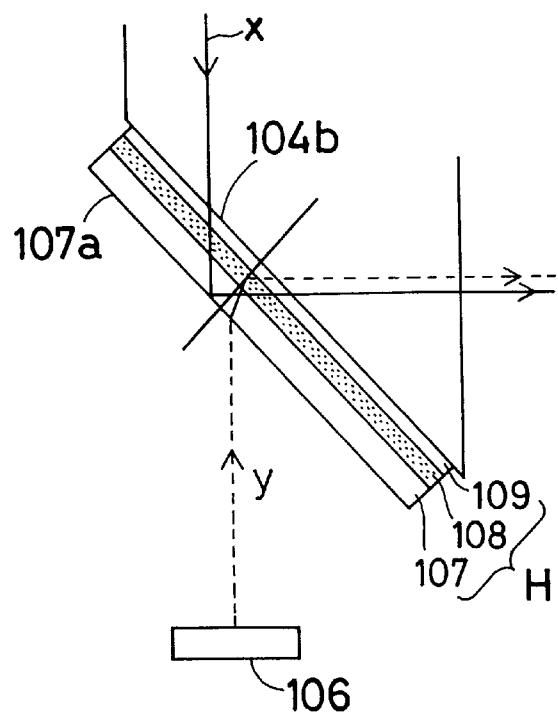
Figure 10A:
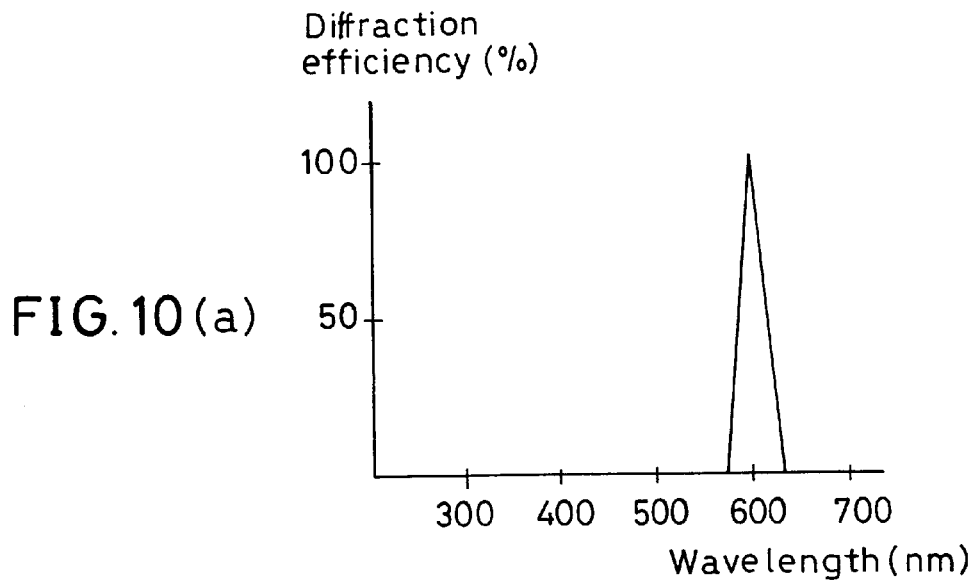
FIGS. 10(a), 10(b) and 10(c) are graphs illustrative of the spectral properties of the optical members used in the embodiments.

FIG. 1(c) is a conceptual rendering of the construction of the hologram H. The hologram H is made up of a substrate 107, a hologram 108 fabricated from a resin material such as a photopolymer, and a protective sheet 109. The hologram 108 herein used is a so-called volume hologram that can reconstruct a high-quality image because of being superior in angle selectivity and wavelength selectivity to a so-called plane hologram. For instance, a specific wavelength vs. diffraction efficiency relation of the volume hologram is shown in FIG. 10(a). From this it is found that the volume hologram shows its diffracting action in a very narrow wavelength range alone. Upon illumination of this hologram with white light, light of a specific wavelength is diffracted but light of other wavelengths is straight transmitted through. Such a hologram H is bonded to the second reflecting surface 104b of the second prism 104. However, ordinary ray bundles can pass straight through the hologram H because the boundary between the hologram H and the reflecting surface 104b has no substantial refractive index difference. Accordingly, a ray bundle x from the finder visual field is entered into the hologram H straight through the second reflecting surface 104b, subjected to total reflection at a surface 107(a) of contact of the substrate 107 with air, and propagates toward the eyepiece 105, again straight through the hologram H. Since the light of the specific wavelength vanishes due to diffraction, however, the transmitted light is somewhat colored, but this is quite acceptable. To avoid this coloring problem, it is known to fabricate a hologram with RGB (red, green and blue) three-colors light to make the transmitted light white.

While, in FIG. 1(c), the layer structure of the hologram H is exaggerated in the thickness direction, it is to be understood that the hologram 108 has a thickness of about a few tens of $\mu$m, and so the thickness of the hologram H with added thicknesses of the substrate 107 and protective sheet 109 is as thin as about 1 mm. In this embodiment, a so-called transmission hologram where an incident ray bundle is reverse in direction to an emergent ray bundle is used for the hologram H.

On the other hand, a ray bundle y from the indication portion 106 is incident on the hologram 108 upon refraction at the surface 107a of contact of the substrate 107 with air. The properties of the hologram 108 acting as an optical member are preset in the form of interference fringes. For instance, the power of the hologram 108 is determined such that an image is formed in the vicinity of the field frame 103 at a given magnification, and the angle of the ray bundle emerging from the hologram 108 is determined such that an indication overlaps the finder visual field. Therefore, if the recording wavelength of the hologram 108 is in coincidence with the wavelength of the indication, the image on the indication portion 106 is then formed as a virtual image at the magnification determined by the diffracting action. The emergent ray bundle, too, leaves the hologram 108 at the determined angle.

Figure 2A:
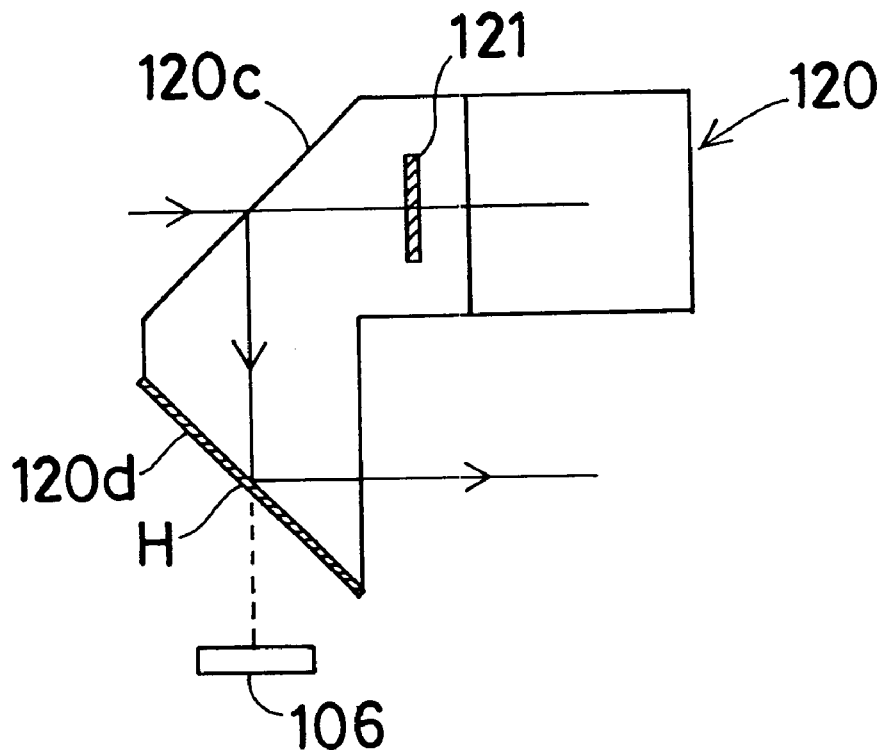
FIGS. 2(a) and 2(b) are views of the construction of the first embodiment wherein two prisms used in the first embodiment are constructed as one part.
Figure 2B:
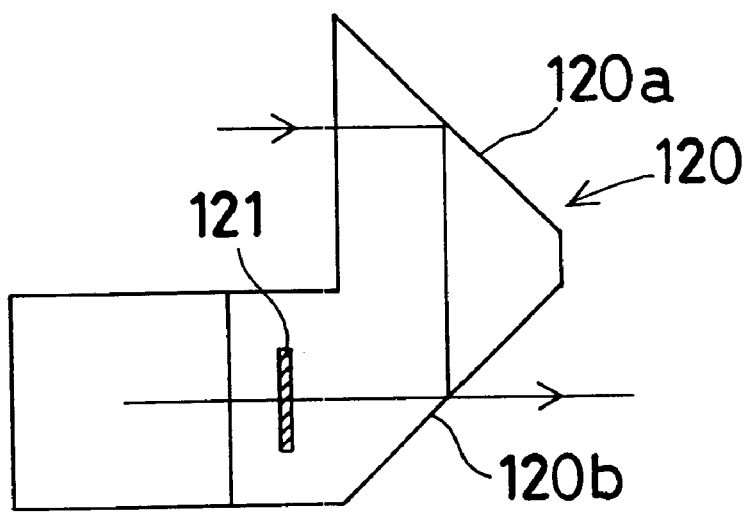

For a better understanding of the embodiment, the field frame 103 is illustrated. However, if this is indicated by the optical member such as a hologram that is the purport of the invention, it is then possible to dispense with the field frame 103 working as a mechanical part. In addition, it is possible to construct the first and second prisms 102 and 104 as an integral part by integral molding. For instance, the image erection system may be constructed from a four-reflection prism 120, as shown in the top and side views attached hereto as FIGS. 2(a) and 2(b). An incident ray bundle is reflected at reflecting surfaces 120a, 120b, 120c and 120d in this order. Then, an intermediate image plane 121 is formed within the prism. Therefore, if a virtual image at the indication portion 106 is formed on the intermediate image plane 121, it is then possible to achieve clear indications.

This arrangement can dispense with mechanical parts for a field frame, and so is favorable for cost reductions. Since the intermediate image plane is positioned within the prism, there is no chance of forming a deposit of dust thereon; that is, a prior art problem that the deposit of dust in the vicinity of an intermediate image becomes noticeable can be eliminated. Due to the absence of any mechanical field frame, a camera operator may view something extra in the finder field. However, this is rather preferable because the camera operator can have a sense of openness. As a matter of course, the position of the field frame indicated by the hologram is in as close alignment with the position of the intermediate position as possible.

Not only can the field frame be indicated but also every indication of an AF target, a strobe mark, etc. is achievable.

When a plurality of wavelengths are used for the information to be indicated, the desired indication within finder is obtainable by use of a hologram formed by multiplex recording of interference fringes corresponding to the respective wavelengths.

Second Embodiment

Figure 3:
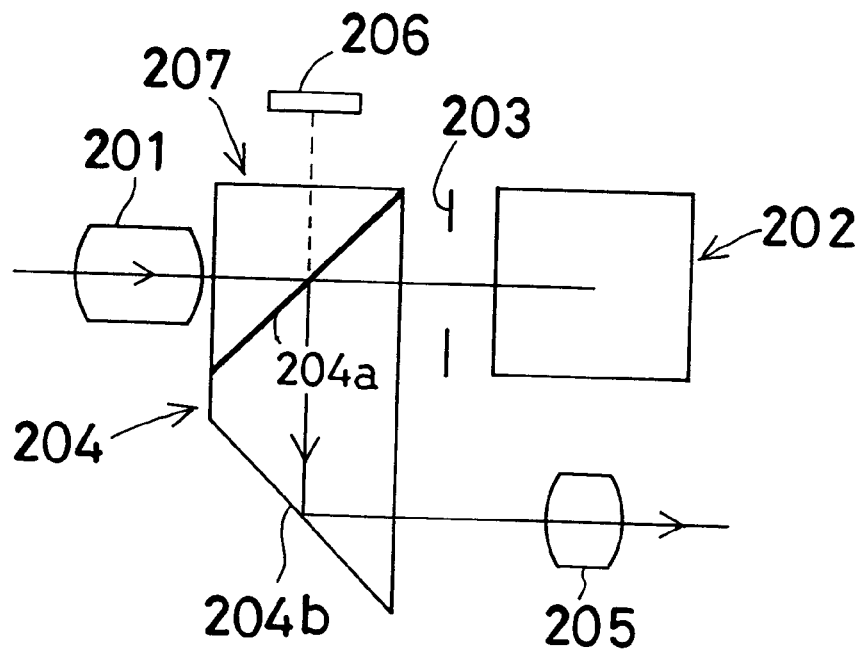
FIGS. 3(a) and 3(b) are views of the construction and action of a second embodiment of the finder according to the invention.
Figure 3:
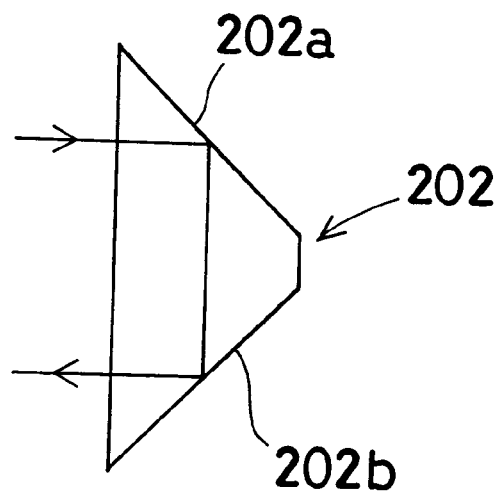

In the second embodiment, the present invention is applied to a Keplerian view finder mounted on a camera. FIG. 3(a) is a top view of this embodiment. A ray bundle from a finder visual field is incident on a first prism 202 upon passing through an objective 201. As can be seen from FIG. 3(b) that is a side view of the first prism 202, the incident ray bundle is reflected at a first reflecting surface 202a, so that an optical path is turned down. Then, the ray bundle is reflected at a second reflecting surface 202b so that the optical path is bent toward a subject side. After the ray bundle is reflected twice by the prism 202, they form an image in the vicinity of a field frame 203. Following this, the ray bundle is incident on a second prism 204 where they are reflected twice at a first reflecting surface 204a and a second reflecting surface 204b, and then arrive at a user through an eyepiece 205.

Figure 10B:
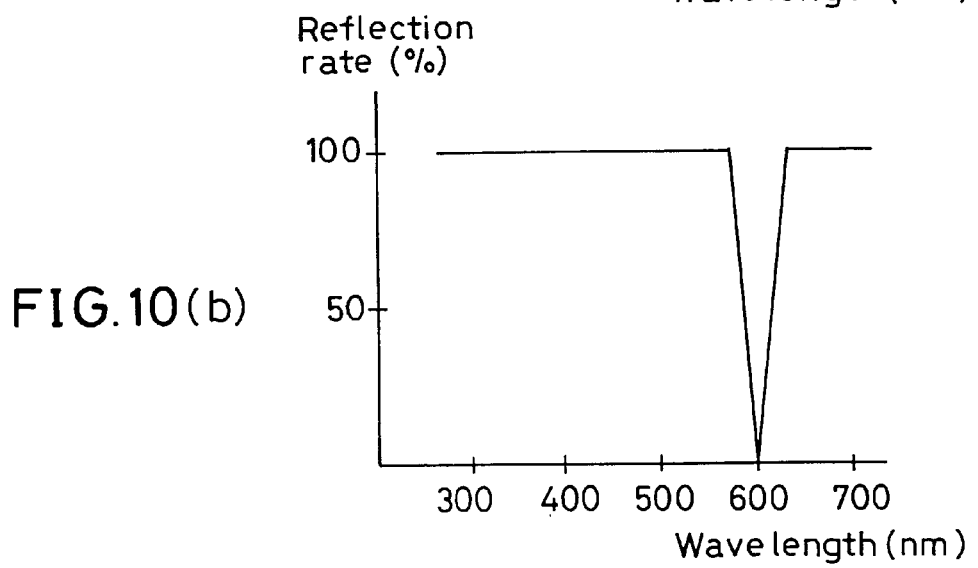

A third prism 207 is cemented to the first reflecting surface 204a of the second prism 204, and the cemented surface is provided thereon with a dielectric film having such a reflectance property as shown in FIG. 10(b). Accordingly, the ray bundle from the finder visual field is reflected at the first reflecting surface 204a where all rays except a specific wavelength ray are reflected at a high reflectance, so that such rays arrive at the user through the second reflecting surface 204b and then the eyepiece 205. On the other hand, an indication ray bundle from an indication portion 206 reaches the dielectric film upon incidence on the third prism 207. If, at this time, the indication wavelength is in alignment with a region of wavelengths that pass through the dielectric film, the indication ray bundle passes straight through the dielectric film for incidence on the second prism 204, so that the user can view an indication while superposed on the finder visual field.

In this embodiment, the ray bundle from the indication portion 206 strikes vertically on the prism 207 for the purpose of reducing light quantity losses due to surface reflection. Alternatively, if an antireflection coating is applied on the incident surface of the prism, it is then possible to achieve further reductions in the light quantity losses. Preferably in this case, the performance of the antireflection coating should be in conformity to the indication wavelength.

When a plurality of wavelengths are used for the information to be indicated, the desired indication within finder is achievable by allowing them to have a plurality of peaks in a very narrow light-transmitting wavelength range as shown in FIG. 10(b) and bringing the wavelengths of the respective peaks in alignment with the wavelength of the indication portion.

Third Embodiment

Figure 4A:
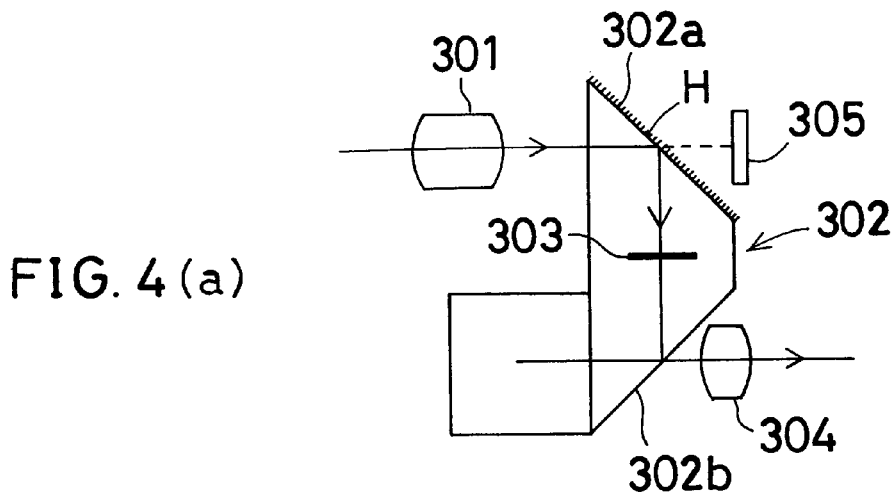
FIGS. 4(a), 4(b) and 4(c) are views of the construction and action of a third embodiment of the finder according to the invention.
Figure 4B:
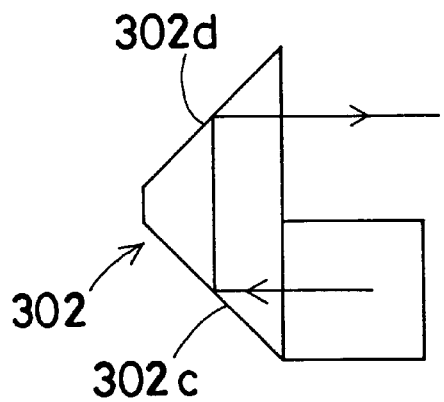

In the third embodiment, the present invention is applied to a Keplerian view finder mounted on a camera. FIG. 4(a) is a top view of this embodiment, and FIG. 4(b) is a side view of a prism 302. In the instant embodiment, an image erection system is constructed from one prism 302 with an intermediate image plane 303 positioned inside the prism. A ray bundle from a finder visual field is incident on the prism 302 upon passing through an objective 301, and then reflected at a first reflecting surface 302a to form an image on the intermediate image plane 303. Thereafter, the ray bundle is reflected at a second reflecting surface 302b so that it is bent toward a subject side, then reflected at a third reflecting surface 302c so that it is turned up, and then reflected at a fourth reflecting surface 302d so that it is bent toward a pupil side, finally arriving at a user through an eyepiece 304.

On the other hand, a hologram H is cemented to the first reflecting surface 302a of the prism 302, so that an image at an indication portion 305 is formed as a real image in the vicinity of the intermediate image plane 303 under the action of the hologram H. The ray bundle arrives at the user through the eyepiece 304 while superposed on the ray bundle from the finder visual field.

Figure 4C:
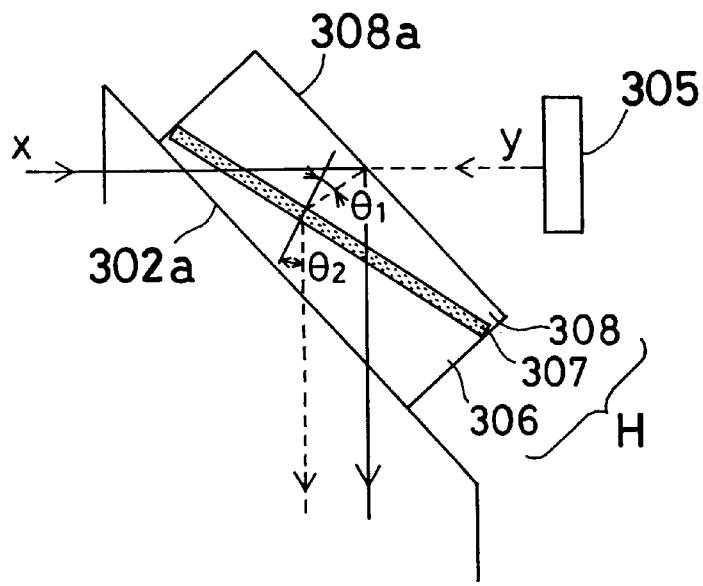

FIG. 4(c) is a conceptual rendering wherein the hologram H and its vicinities are exaggerated. In FIG. 4(c), too, the layer structure of the hologram H is exaggerated in its thickness direction, and this embodiment is identical with the first embodiment with the exception that a hologram 307 is tilted. As in the first embodiment, a ray bundle x from the finder visual field passes straight through a boundary surface 302a for total reflection at an surface 308a in contact with air. An indication ray bundle y is refracted at the air contact surface 308a, and then diffracted at the hologram 307 so that it is superposed on the ray bundle x from the finder visual field. Since the hologram 307 is tilted, $\theta_1 = \theta_2$ where $\theta_1$ is the angle of incidence of the ray bundle on the hologram 307 and $\theta_2$ is the angle of diffraction (incidence) of the ray bundle from the hologram 307, as explained below.

Figure 9:
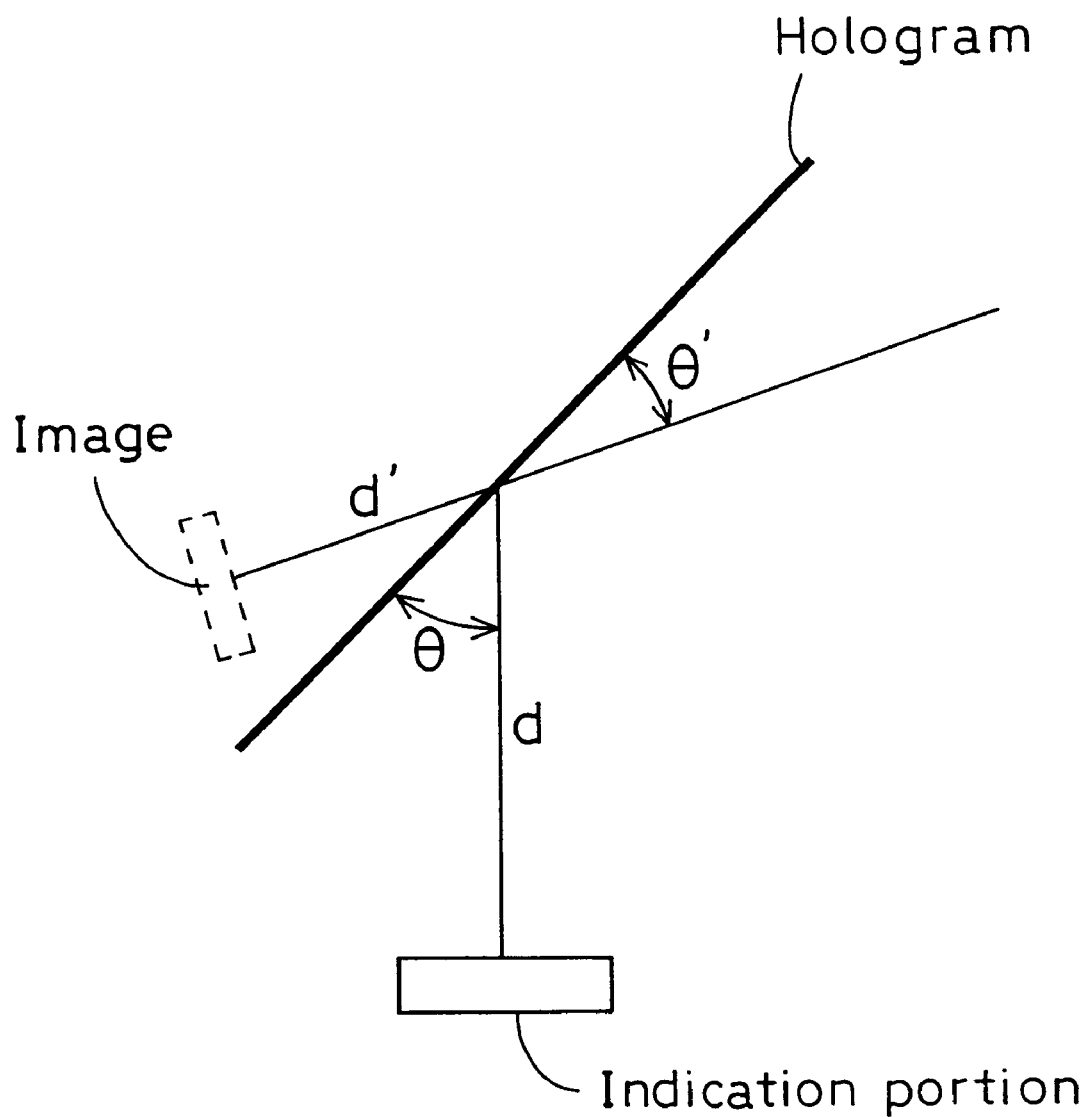
FIG. 9 is a view of how an image is formed by an holographic optical element.

If the interference fringes to be recorded on a hologram are properly arranged, the hologram can then be used as one optical element (generally referred to as a holographic optical element), for instance, as a lens, a concave mirror, a convex mirror or the like. For instance, when a hologram, here assumed to be a volume hologram, is used as a reflecting mirror as shown in FIG. 9, optical properties of the hologram, e.g., power or the values of an angle of incidence θ and an exit angle θ', may be determined by the pitch, angle, etc. of the interference fringes three-dimensionally formed in a resin layer having a certain thickness. If the power is determined, then the magnification can be found from an object distance d and an image distance d'. Such optical properties can be paraxially varied at a designer's disposal, so that the degree of flexibility in the layout of the hologram in a camera can become high.

When indications are actually presented in a camera finder, however, a hologram produces some considerable aberrations due to a large indication portion size, which are then a factor for quality degradation in indicated images. To obtain high-quality indications, therefore, it is desired that d=d' and θ=θ' in FIG. 9. This means that the hologram is used as a simple mirror surface.

To obtain high-quality indications according to the instant embodiment while aberrations are reduced, it is thus required that the hologram 307 be tilted as in FIG. 4(c), thereby making the angle of incidence $\theta_1$ equal to the exit angle $\theta_2$. Consequently, both substrate materials 306 and 308 are in a wedge form.

Fourth Embodiment

Figure 5:
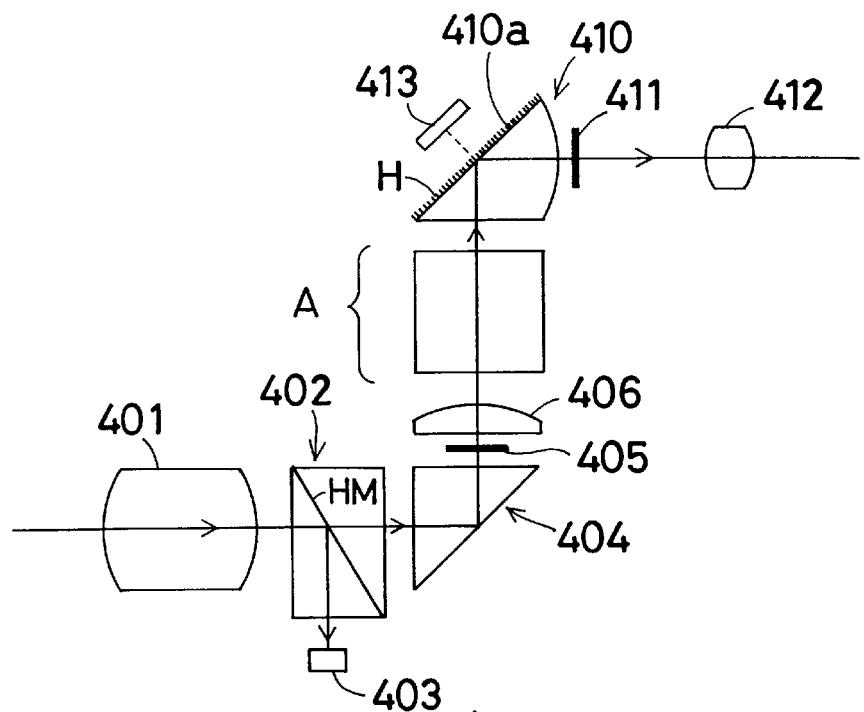
FIGS. 5(a), 5(b) and 5(c) are views of the construction and action of a fourth embodiment of the finder according to the invention.
Figure 5:
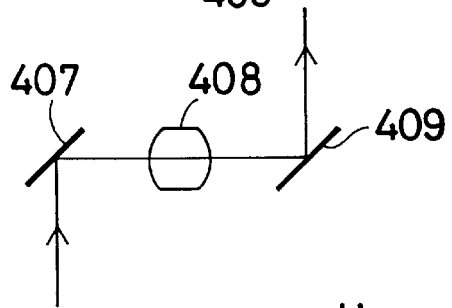
Figure 5:
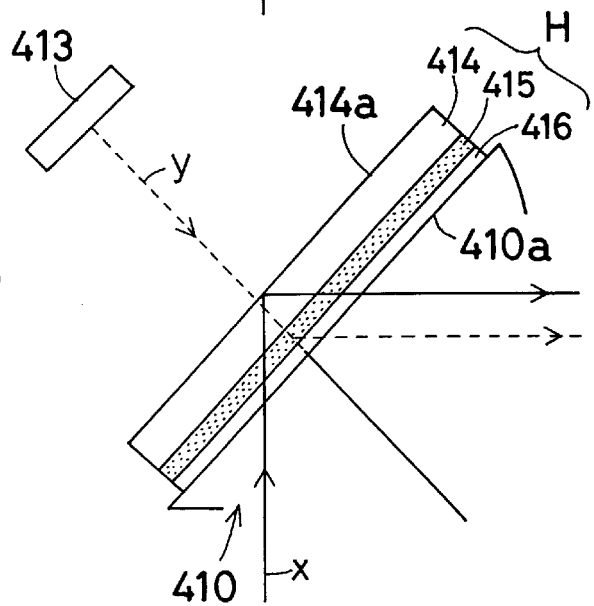

In the fourth embodiment, the present invention is applied to a TTL finder used on a digital still camera, wherein a finder system is a relay type real image finder. FIG. 5(a) is a side view of this embodiment, and FIG. 5(b) is a front view of a portion A in FIG. 5(a). A ray bundle passing through a phototaking lens 401 is divided by a prism 402 into light for an image pickup system and light for the finder system. The prism 402 includes a half-silvered mirror HM. The light for the image pickup system is reflected at the half-silvered mirror HM, arriving at an image pickup element (e.g., CCD or CMOS) 403. The light for the finder system passes through the half-silvered mirror HM, and is turned up by one reflection at a first prism 404. Thereafter, the light forms a primary intermediate image 405 at a position equivalent to the image pickup element 403. Then, the light is converted through a field lens 406 to substantially telecentric light, which in turn passes through the portion A. The light is bent by reflection at a first mirror 407, passes through an image-formation lens 408 in the relay system, and is again turned up by reflection at a second mirror 409. Then, the light is bent by a second prism 410 toward a pupil side to form a second intermediate image 411 which is observed through an eyepiece 412.

On the other hand, a hologram H is cemented to a reflecting surface 410a of the second prism 410, so that an image at an indication portion 413 is formed by the hologram H as a real image in the vicinity of the second intermediate image 411. The image then arrives at an user through the eyepiece 412 while superposed on the ray bundle from the finder visual field.

In the instant embodiment, too, the user can thus view the visual field and the indication at the same time. In this embodiment, too, the field frame is indicated by the hologram H; that is, any mechanical field frame member or any mechanism member therefor is not required. The field frame may be positioned at either the first intermediate plane 405 or the second intermediate plane 411. However, it is desired that the hologram H be as close to the intermediate planes as possible. Away from the intermediate planes, the magnification of the hologram H becomes high, resulting in an increase in the amount of aberrations produced and, hence, degradation in the quality of indications. In any case, it is thus desired that the hologram H be positioned as closely to the intermediate images as possible to form a life-size image at the indication portion 413.

FIG. 5(c) is a conceptual rendering wherein the hologram H and its surroundings are exaggerated. A ray bundle x from the finder visual field passes straight through a boundary surface 410a for total reflection at a surface 414a in contact with air. An indication ray bundle y strikes vertically on the air contact surface 414a, and is then diffracted by the hologram 415 for superposition on the ray bundle x from the finder visual field. In the hologram H shown in FIG. 5(c), a layer 414 is constructed of a substrate material, a layer 415 is constructed of a hologram, and a layer 416 is constructed of a protective sheet.

Fifth Embodiment

Figure 6:
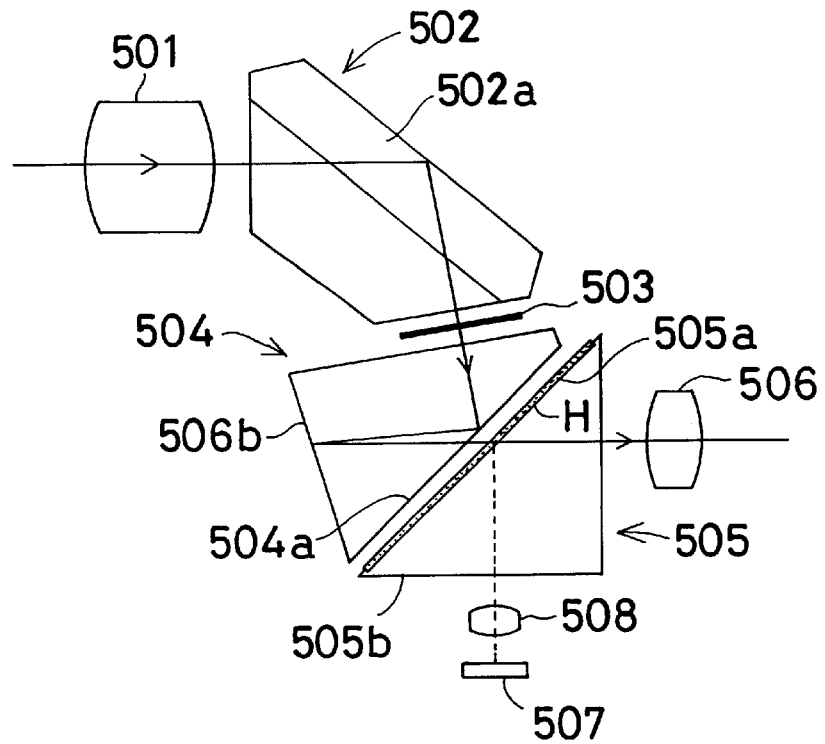
FIG. 6 is a view of the construction and action of a fifth embodiment of the finder according to the invention.

In the fifth embodiment, the present invention is applied to a Keplerian view finder mounted on a camera. FIG. 6 is a top view of this embodiment. A ray bundle from a finder visual field is incident on a first prism 502 upon passing through an objective 501. A reflecting surface 502a of the first prism 502 is formed by a Dach surface at which the incident ray bundle is reflected twice to form an intermediate image 503. Then, the ray bundle is reflected at a first reflecting surface 504a upon incidence on a second prism 504, so that the ray bundle is bent toward a subject side. Following this, the ray bundle is reflected at a second reflecting surface 504b so that it is bent toward a pupil side. At this time, this ray bundle passes through the first reflecting surface 504a. A third prism 505 is positioned with a slight air separation sandwiched between the second prism 504 and it. The ray bundle from the visual field passes through an incident surface 505a of the third prism 505, arriving at the eye of a user through an eyepiece 506.

On the other hand, a hologram H is cemented to the incident surface 505a of the third prism 505, so that a ray bundle incident from an indication portion 507 on a side surface 505b of the third prism 505 is diffracted by the hologram toward a pupil side. Since, in this case, the ray bundle is vertically incident on the side surface 505b, light quantity losses can be minimized. Alternatively, if an anti-reflection coating optimized for an indication wavelength is used, a transmittance of approximately 100% is achievable.

The hologram H used herein is a reflection hologram. In the arrangement shown in FIG. 6, aberrations are reduced because both the angle of incidence and the exit angle are 45°. Preferably in the view of aberration reductions, the distance between the indication portion 507 and the hologram H is properly determined thereby achieving life-size image formation. In the instant invention, however, the length of the optical path from the hologram H to the indication portion 507 is long. To form a life-size image in this case, it is thus required to make the distance from the hologram H to the indication portion 507 long. According to this embodiment, however, a life-size image can be formed by additionally incorporating a lens 508 in the optical path from the indication portion 507. This also contributes to a size reduction of the entire finder system.

As explained above, the hologram H in this embodiment acts as a mirror surface alone. It is accordingly acceptable to use a conventional half-silvered mirror instead of the hologram. With the conventional half-silvered mirror, however, the quantity of light is divided into reflected light and transmitted light at every wavelength, inevitably causing the quantity of light in the visual field to drop at every wavelength. This then causes both indications and the visual field to become dark. However, if a hologram is used, the action on a specific wavelength alone can then be obtained. For instance, when the hologram H is used, all the ray bundle from the visual field except a light component of the specific wavelength determined by the hologram H can pass through the hologram H. If the emission wavelength of the ray bundle from the indication portion 507 is aligned with the specific wavelength determined by the hologram H, substantially all light can be diffracted toward the pupil side. In an indication system using a hologram, accordingly, a visual field can be superposed on indications without detrimental to the brightness of both the visual field and the indications. It is thus possible to obtain a very bright, clear finder although the finder visual field is slightly colored.

Figure 10C:
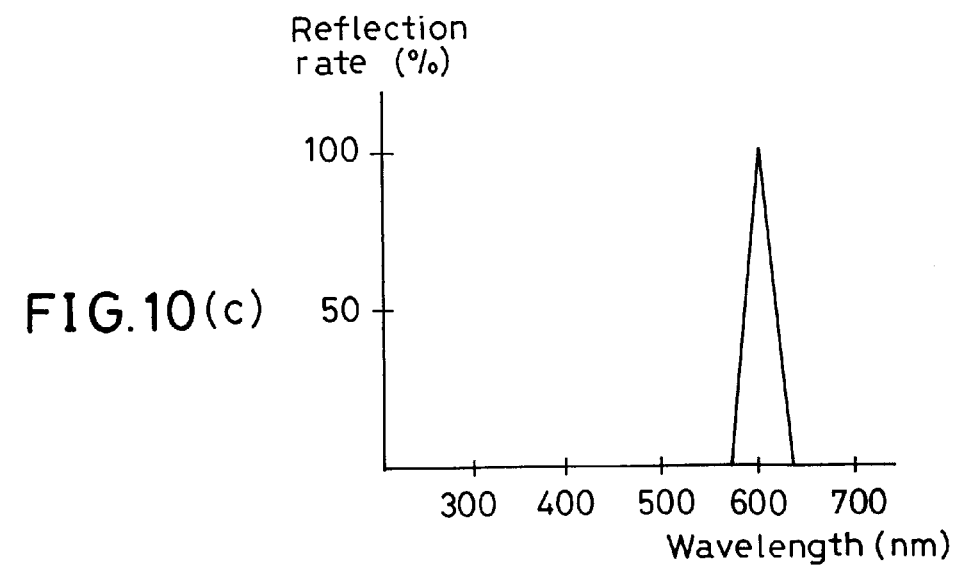

Even when, in the instant embodiment, a dielectric film having such a reflectance property as shown in FIG. 10(c) rather than the conventional half-silvered mirror is used in place of the hologram H, similar effects are obtainable.

Sixth Embodiment

Figure 7:
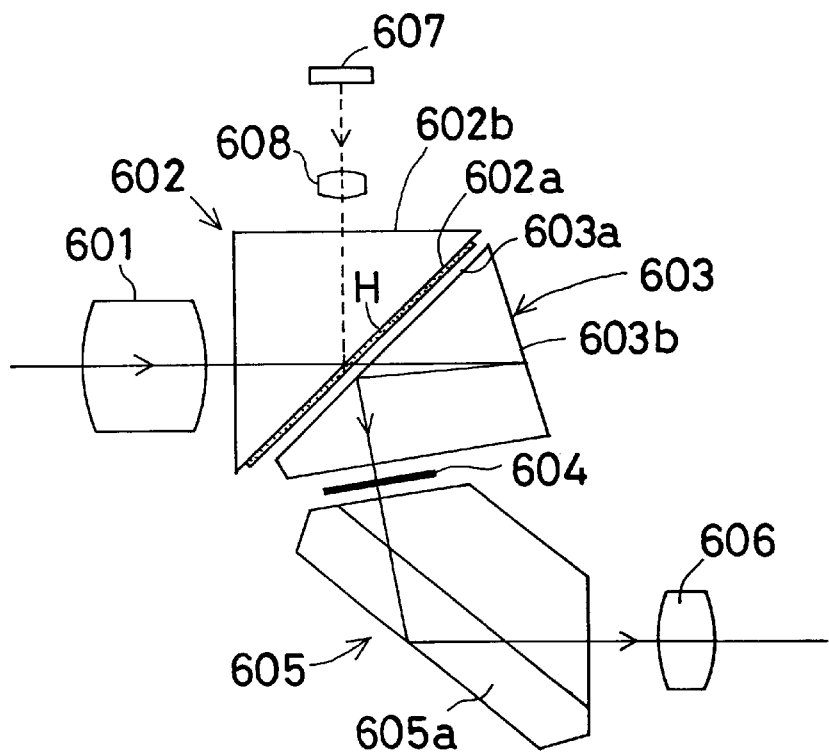
FIG. 7 is a view of the construction and action of a sixth embodiment of the finder according to the invention.

In the sixth embodiment, the present invention is applied to a Keplerian view finder mounted on a camera. FIG. 7 is a top view of this embodiment. A ray bundle from a finder visual field is incident on a first prism 602 upon passing through an objective 601. The ray bundle upon passing a transmitting surface 602a of the first prism 602, and then strikes on a second prism 603 through a surface 603a thereof. The ray bundle is reflected at a first reflecting surface 603b toward a subject side, and now reflected at the surface 603a so that it is bent in a lateral direction to form an image on an intermediate image plane 604. Thereupon, the ray bundle is incident on a third prism 605 with a Dach reflecting surface 605a, so that a user can observe it through an eyepiece 606.

On the other hand, a hologram H is cemented to the transmitting surface 602a of the first prism 602, and a ray bundle from an indication portion 607 is vertically incident on a side surface 602b of the first prism 602. In this embodiment, the hologram H is of a transmission type. However, a lens 608 is located, as shown, thereby achieving life-size image formation, and size reductions. Aberrations are reduced by making the angle of incidence equal to the exit angle.

Seventh Embodiment

Figure 8A:
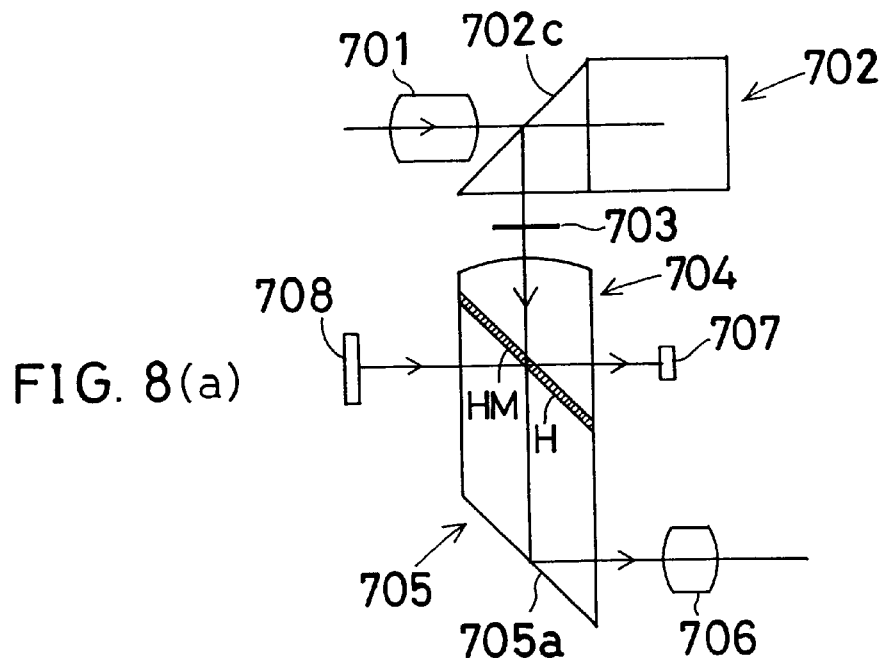
FIGS. 8(a), 8(b) and 8(c) are views of the construction and action of a seventh embodiment of the finder according to the invention.
Figure 8B:
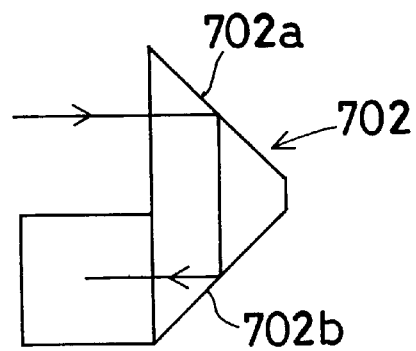
Figure 8C:
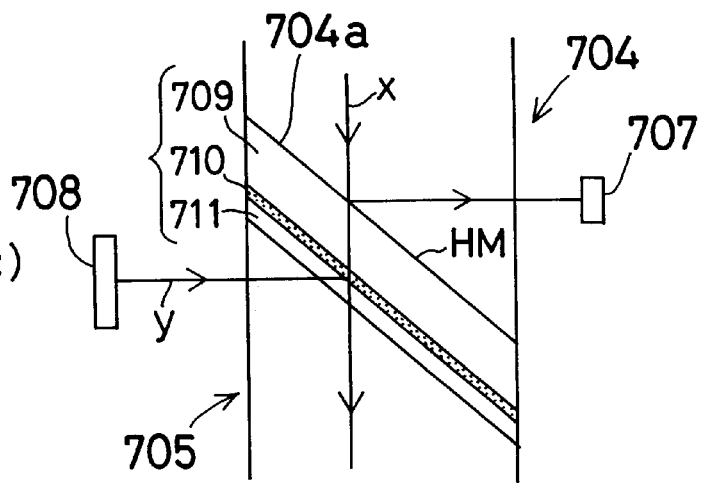

In the seventh embodiment, the present invention is applied to a Keplerian view finder mounted on a camera. FIG. 8(a) is a top view of this embodiment. FIG. 8(b) is a side view of a first prism 702, and FIG. 8(c) is a conceptual rendering wherein a hologram H and its vicinities are exaggerated. A ray bundle from a finder visual field passes through an objective 701 and then strike on the first prism 702 where it is reflected three times to form an image on an intermediate image plane 703. As shown in FIG. 8(b), the ray bundle incident on the first prism 702 is turned down at a first reflecting surface 702a, bent at a second reflecting surface 702b toward a subject side, and bent at a third reflecting surface 702c toward the intermediate image plane 703. Upon formation of the image on the intermediate image plane 703, the ray bundle passes through a second prism 704 and a third prism 705, and is then bent toward a pupil side by reflection at a reflecting surface 705a of the third prism 705, so that a user can observe it through an eyepiece 706.

In the instant embodiment, a half-silvered mirror HM is sandwiched between the second prism 704 and the third prism 705 to guide a part of the ray bundle from the finder visual field to a receiving element 707 side for photometry. In this embodiment, a hologram H is sandwiched between the second prism 704 and the third prism 705 to achieve indication within finder.

As shown in FIG. 8(c), a ray bundle x from the finder visual field is divided by the half-silvered mirror HM, and a part thereof is reflected thereat, arriving at the photometric element 707. The other part of the ray bundle passing through the half-silvered mirror HM passes intermediately through the third prism 705, arriving at the user. On the other hand, a hologram H is sandwiched between the third prism 705 and the half-silvered mirror HM. The hologram H is made up of a substrate material 709, a hologram 710 formed of a resin material and a protective sheet 711, as in the first embodiment. A ray bundle from an indication portion 708 strikes on a side surface of the third prism 705, and is then diffracted by the hologram H so that the user can observe the diffracted light while superposed on the ray bundle from the finder visual field. An indication image is formed as a virtual image on the intermediate image plane 703.

While the finder with a holographic indicator according to the present invention has been explained with reference to several embodiments, it is to be understood that the present invention is in no sense limited thereto and many modifications may be made thereto.

As can be clearly understood from the foregoing explanation, the present invention provides a high-quality finder which can indicate various information in the finder visual field and is bright in terms of both the visual field and indications.

What we claim is:

1. A finder optical system having an indicator, comprising:

an objective system;

an image erection system; and an eyepiece system, wherein a hologram is provided on a reflecting surface in said image erection system and an indication portion is provided separately from said hologram so that an image at said indication portion is indicated by said hologram in a finder visual field.

2. The finder optical system having an indicator according to claim 1, wherein said hologram is of transmission type.

3. The finder optical system having an indicator according to claim 1, wherein said reflecting surface is a total-reflecting surface.

4. The finder optical system having an indicator according to claim 1, wherein said hologram is a regular reflection member having no power.

5. The finder optical system having an indicator according to claim 2, wherein said hologram has no power.

6. A finder optical system having an indicator, comprising:

an objective system;

an image erection system; and an eyepiece system, wherein a hologram is provided on a transmitting surface in said image erection system and an indication portion is provided separately from said hologram so that an image at said indication portion is indicated by said hologram in a finder visual field.

7. A finder optical system having an indicator, comprising:

an objective system;

an image erection system; and an eyepiece system, wherein a hologram is provided on a reflecting surface in said image erection system and located obliquely with respect to an intermediate image plane formed by said objective system so that an image at an indication portion is indicated by said hologram in a finder visual field.

8. A finder optical system having an indicator according to claim 7, further comprising a prism located between said hologram and said intermediate image plane.

9. A finder optical system having an indicator, comprising an objective system;

an image erection system; and an eyepiece system, wherein a hologram is provided on a transmitting surface in said image erection system and located obliquely with respect to an intermediate image plane formed by said objective system so that an image at an indication portion is indicated by said hologram in a finder visual field.

10. A finder optical system having an indicator according to claim 9, further comprising a prism located between said hologram and said intermediate image plane.

11. A finder optical system having an indicator, comprising:
- an objective system;
- an image erection system; and
- an eyepiece system,
    - wherein a hologram is provided on a reflecting surface in said image erection system so that an image at said indication portion is indicated by said hologram in a finder visual field, and
    - wherein said reflecting surface is a total-reflecting surface.

12. A finder optical system having an indicator, comprising:
- an objective system;
- an image erection system; and
- an eyepiece system,
    - wherein a hologram is provided on a transmitting surface in said image erection system so that an image at said indication portion is indicated by said hologram in a finder visual field, and
    - wherein said hologram is a regular reflecting member having no power.

* * * * *